(12) United States Patent
Dzhurinskiy et al.

(10) Patent No.: US 10,008,047 B2
(45) Date of Patent: **\*Jun. 26, 2018**

(54) CHROMA KEY CONTENT MANAGEMENT SYSTEMS AND METHODS

(71) Applicant: NANTMOBILE, LLC, Culver City, CA (US)

(72) Inventors: Evgeny Dzhurinskiy, Manhattan Beach, CA (US); Ludmila Bezyaeva, St. Petersburg (RU)

(73) Assignee: NANTMOBILE, LLC, Culver City, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/498,247

(22) Filed: Apr. 26, 2017

(65) Prior Publication Data

US 2017/0228941 A1 Aug. 10, 2017

Related U.S. Application Data

(63) Continuation of application No. 14/465,712, filed on Aug. 21, 2014, now Pat. No. 9,761,053.

(Continued)

(51) Int. Cl.
*G06T 15/00* (2011.01)
*G06T 19/20* (2011.01)
(Continued)

(52) U.S. Cl.
CPC .............. *G06T 19/20* (2013.01); *G06T 15/04* (2013.01); *G06T 19/006* (2013.01); *G06T 2215/12* (2013.01); *G06T 2219/2012* (2013.01)

(58) Field of Classification Search
CPC .................................................. G06T 19/006
See application file for complete search history.

(56) References Cited

U.S. PATENT DOCUMENTS

| 6,414,696 B1 | 7/2002 | Ellenby et al. |
| 7,016,532 B2 | 3/2006 | Boncyk et al. |

(Continued)

FOREIGN PATENT DOCUMENTS

| KR | 10-2006-0090367 | 8/2006 |
| KR | 10-2008-0082759 | 9/2008 |

(Continued)

OTHER PUBLICATIONS

Gorman, M., "Ikea's 2014 Catalog app lets you arrange virtual furniture in your living room via augmented reality (video)", engaget, http://www.engadget.com/2013/08/06/ikeas-2014-catalog-app-augmented-reality/, screen capture Aug. 6, 2013.

(Continued)

*Primary Examiner* — Charles Tseng
(74) *Attorney, Agent, or Firm* — Stetina Brunda Garred & Brucker

(57) ABSTRACT

A system of properly displaying chroma key content is presented. The system obtains a digital representation of a 3D environment, for example a digital photo, and gathers data from that digital representation. The system renders the digital representation in an environmental model and displays that digital representation upon an output device. Depending upon the context, content anchors of the environmental model are selected which will be altered by suitable chroma key content. The chroma key content takes into consideration the position and orientation of the chroma key content relative to the content anchor and relative to the point of view that the environmental model is displayed from in order to accurately display chroma key content in a realistic manner.

30 Claims, 2 Drawing Sheets

Related U.S. Application Data

(60) Provisional application No. 61/868,349, filed on Aug. 21, 2013.

(51) Int. Cl.
  *G06T 15/04* (2011.01)
  *G06T 19/00* (2011.01)

(56) References Cited

U.S. PATENT DOCUMENTS

| | | |
|---|---|---|
| 7,528,890 B2 | 5/2009 | Staker et al. |
| 8,040,361 B2 | 10/2011 | Bachelder et al. |
| 8,059,889 B2 | 11/2011 | Kobayashi et al. |
| 8,218,873 B2 | 7/2012 | Boncyk et al. |
| 8,224,077 B2 | 7/2012 | Boncyk et al. |
| 8,224,078 B2 | 7/2012 | Boncyk et al. |
| 8,275,590 B2 | 9/2012 | Szymczyk et al. |
| 8,395,711 B2 | 3/2013 | Oz et al. |
| 8,396,328 B2 | 3/2013 | Sandrew et al. |
| 8,502,835 B1 | 8/2013 | Meehan |
| 2004/0218100 A1 | 11/2004 | Staker et al. |
| 2005/0099603 A1 | 5/2005 | Thomas et al. |
| 2007/0236510 A1 | 10/2007 | Kakuta et al. |
| 2011/0150292 A1 | 6/2011 | Boncyk et al. |
| 2011/0249090 A1 | 10/2011 | Moore et al. |
| 2012/0008003 A1* | 1/2012 | Lim .................. G06F 3/14 348/222.1 |
| 2012/0075285 A1 | 3/2012 | Oyagi et al. |
| 2012/0092328 A1 | 4/2012 | Flaks et al. |
| 2012/0249416 A1 | 4/2012 | Maciocci et al. |
| 2012/0201472 A1 | 8/2012 | Blanchflower et al. |
| 2013/0095924 A1 | 4/2013 | Geisner et al. |
| 2013/0107021 A1 | 5/2013 | Maizels et al. |
| 2014/0347392 A1* | 11/2014 | Odessky ........... A61B 5/1121 345/633 |

FOREIGN PATENT DOCUMENTS

| | | |
|---|---|---|
| KR | 10-2012-0137021 | 12/2012 |
| WO | 98/46323 | 10/1998 |

OTHER PUBLICATIONS

Korean Intellectual Property Office, "Notification of Transmittal of the International Search Report and the Written Opinion of the International Searching Authority, or the Declaration", International Application No. PCT/US2014/052188, dated Nov. 26, 2014.

Nakajima et al., A Support System for Maintenance Training by Augmented Reality, Proceedings of the 12th International Conference on Image Analysis and Processing, Sep. 2003.

* cited by examiner

CHROMA KEY CONTENT MANAGEMENT SYSTEMS AND METHODS

This application is a continuation of U.S. application Ser. No. 14/465,712, filed Aug. 21, 2014, which claims the benefit of priority to U.S. Provisional Application No. 61/868,349, filed on Aug. 21, 2013. This and all other extrinsic references referenced herein are incorporated by reference in their entirety.

FIELD OF THE INVENTION

The field of the invention is digital content management technologies.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Virtual environments are useful in providing various interactive environments, such as interactive gaming environments (e.g., virtual 3D role-playing game, etc.), interactive training environments (e.g., a driving training, an aviation training, a military training, etc.), and interactive marketing environments (e.g., a virtual dressing room, etc.). Unfortunately, such virtual environments require extensive work to develop virtual content and considerable expense to deploy the content in varied environments. Further, the resulting developed content is purpose-built for a specific deployment, which renders the developed content unusable for other environments.

Others have put forth effort toward developing systems and methods for providing a virtual environment that can be modified by chroma key content. For example, U.S. Pat. No. 7,528,890 to Staker titled "Interactive system and method for video compositing" issued in May 5, 2009, discusses a system and a chroma key mixer device that generates a composite image by combining a real-time image, including modified real-time images, superimposed onto a prerecorded image. Staker's system enables a user to overlay an image taken from the user's video recorder onto video footage that the user is watching. Thus, Staker's system allows a user to virtually "insert" himself or herself into a video game and interact with objects within the video game environment. However, Staker only discusses overlaying real object images onto prerecorded video streams, where the object images are specifically purpose-built for video game deployment.

In another example, U.S. patent application 2005/0099603 to Thomas titled "Virtual studio system," published in May 12, 2005, discusses a method of rendering an image to a participant in a studio according to an estimate of the viewpoint of the participant. The participant's viewpoint is calculated based an estimate of position of a body portion of the participant and a physical relationship of the body portion to the eyes of the participant. Thomas further discusses that the image can be superimposed on a static object or on a movable object so that any physical object can be superimposed with a graphic or can be replaced with a virtual object. However, Thomas's disclosure is limited to project pre-selected, purpose-built images superimposed onto a background object.

Similarly, U.S. Pat. No. 8,395,711 to Oz titled "Method and system for fusing video streams" issued in Mar. 12, 2013, discusses a method for converting video streams of a scene to video streams fitting a viewpoint configuration obtained from calculation of parameters. Oz further discusses a step of integrating the scene into the video stream of a certain scene associated with the viewpoint configuration. However, Oz's chroma key content is limited to image content captured by adjacent video cameras.

U.S. Pat. No. 8,040,361 to Bachelder titled "Systems and methods for combining virtual and real-time physical environment," issued in Oct. 18, 2011, discusses systems and methods for combining captured real-time video data and real-time 3D environment into a single scene using a chroma key process. Bachelder further discusses a field of view visual system by using motion cueing systems to account for user position and orientation, which would allow the virtual image to move in response to a user's movement or other virtual movements. However, Bachelder's system fails to discuss a system that manages and obtains chroma key content based on the object attributes or contextual trigger from the real-time 3D environment.

U.S. Pat. No. 8,059,889 to Kobayashi titled "Position and orientation measurement apparatus and control method thereof" issued Nov. 15, 2011, discusses an apparatus for measuring the position and orientation of an image-capturing apparatus, which is used to capture an image of a measurement object. Kobayashi extrapolates the position and orientation of a measurement object from a captured two dimensional image, and uses a chroma-key composition apparatus to composite the captured measurement object superimposed virtual CG objects. Kobayashi also fails to discuss a system that manages and obtains chroma key content based on the object attributes or contextual trigger from the real-time 3D environment.

In some cases, a user can require different types of chroma key content based on different object attributes of the 3D environment. In other cases, different types of chroma key content would be needed based on the context of the 3D environment. Thus, a user of virtual environment would benefit to have a multi-purpose virtual environment if the user can utilize a system to obtain chroma key content based on the contextual trigger or object attributes of the 3D environment.

Thus, there is still a need for system, device, and method capable of managing chroma key content, which includes obtaining chroma key content based on the object attributes or contextual triggers from the real-time 3D environment.

SUMMARY OF THE INVENTION

The inventive subject matter provides apparatus, systems and methods in which one can manage chroma key content to render the chroma key content at a position and orientation within a environmental model of a 3D environment with respect to a point of view. One aspect of the inventive subject matter includes a chroma key content source interface and a content management engine coupled with the chroma key content source interface. The chroma key content source interface (e.g., an API, an HTTP server, a memory access, a file system, a database, etc.) provides the content management engine access to one or more content sources, which stores addressable chroma key content. Chroma key content can include substantially 2D content (e.g., image content, text content, video content, etc.) or 3D content (a 3D model, a 3D mask, a 3D video, etc.).

The content management engine is configured to obtain a digital representation (e.g., an image data, an audio data, a tactile data, a location data, etc.) of a 3D environment. The content management engine can derive environment attributes (e.g. time, location, temperature, inventory, context, etc.) from the digital representation. The content management engine is configured to identify at least one content anchor associated with the 3D environment based on a contextual trigger as a function of digital representation or as a function of the environment attributes. For example, the content management engine can identify a window as a possible anchor on the wall of an office as an object capable of being virtually modified. As another example, the content management engine can identify a sound of classical music as a content anchor. The content management engine is further configured to leverage the environment attributes to obtain chroma key content via the content source interface, possibly through a database storing the content as indexed by the environment attributes, in preparation for presentation within the environment relative to the content anchor.

The content management engine can further establish a content position and a content orientation relative to the content anchor as a function of content attributes of the chroma key content and the content anchor. The content anchor can comprise an anchor position and an anchor orientation relative to a point of view derived from the digital representation. The content anchor can also comprise an anchor position and an anchor orientation based on the location of where the digital representation was captured. Thus, the content management engine can be considered to build an environmental model of the environment where the anchor position and orientation aid in determining where content should be placed within a rendering of the model. The content management engine can configure an output device (e.g., a cell phone, an appliance, a movie camera, a game console, a kiosk, etc.) to render the chroma key content at the content position and content orientation within the environmental model of the 3D environment with respect to a point of view. In some embodiments, the content anchor can be derived from a point of view from a virtual position and virtual orientation.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
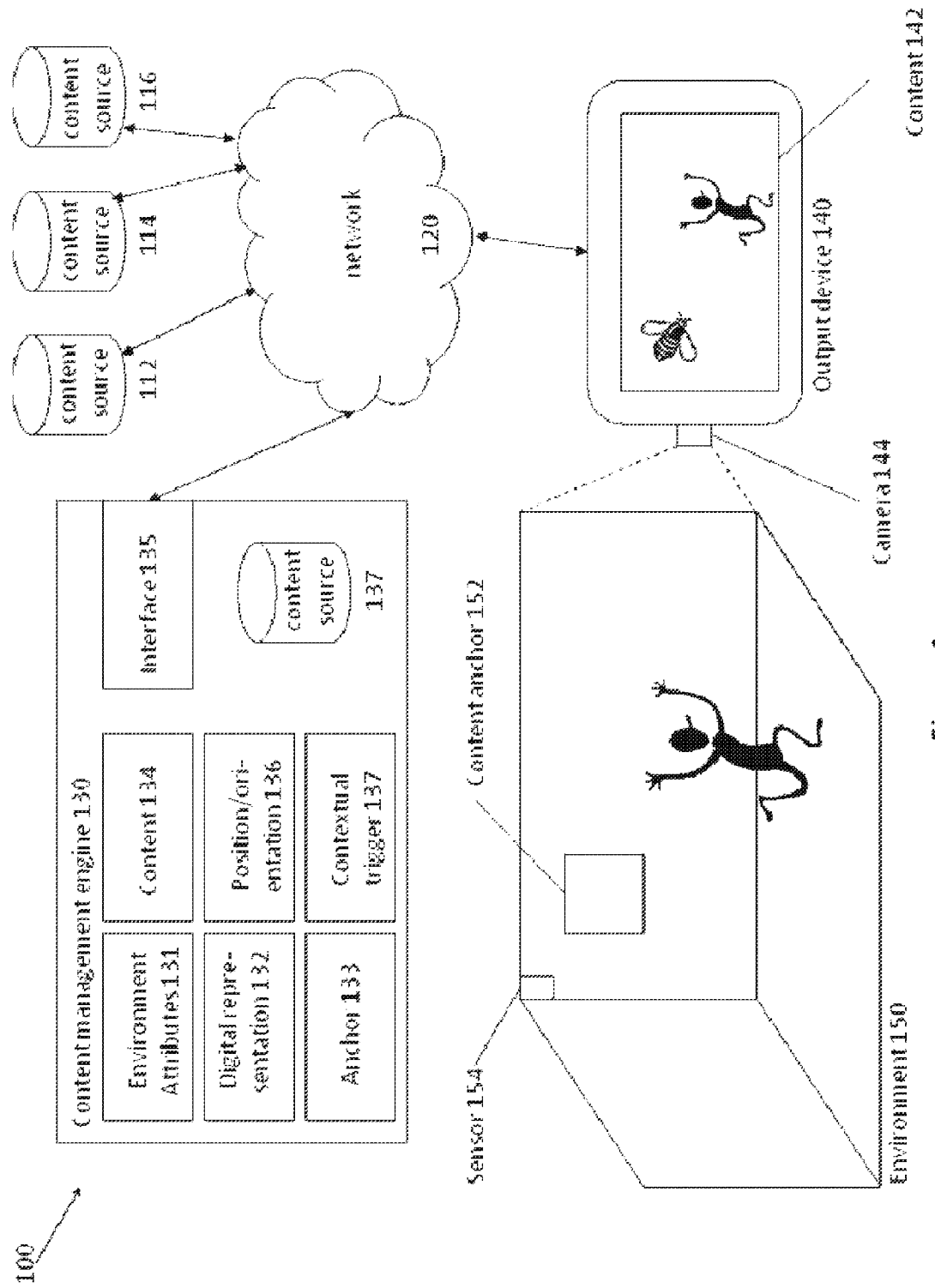
FIG. 1 is a schematic of an exemplary chroma key content management system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including enabling a computing device to dynamically select and project chroma key content onto an augmented reality scene based upon environmental variables and context.

FIG. 1 depicts a schematic of an exemplary chroma key content management system 100. The system includes one or more of chroma key content sources 112, 114, and 116 and a content management engine 130 functionally coupled to the content sources via chroma key content source interface 135, and configured to construct, manipulate, and output a digital version of 3D environment 150 on an output device 140.

While the roles or responsibilities of the various inventive elements of content management engine 130 are deployed on a single computer system having a non-transient computer-readable memory (e.g. a hard drive, flash memory, ROM, disk, SAN, NAS, tape, etc.) with computer software instructions configured to be executed by at least one processing unit (e.g. a processor, a processing core, etc.) on the computer system, content management engine 130 could be deployed or distributed across a plurality of suitably configured computing devices of the ecosystem. For example, in an alternative embodiment, output device 140 (e.g., a cell phone, a PDA, a kiosk, a computer system, a computer terminal, a game device, etc.) could comprise the content management engine 130 and the chroma key content sources 112, 114, 116. In yet another embodiment, the output device 140 could comprise one or more applications that configure the output device 140 to functionally couple with a plurality of networked computer systems having a distributed application forming content management engine 130 through network 120, and each of the chroma key content sources 112, 114, and 116 comprise a different computer server housing various chroma key content. Network 120 comprises a wired or wireless network of interconnected computer systems (e.g., the Internet, cellular network, WAN, VPN, LAN, Personal area network, WiFi Direct network, DLNA network, peer-to-peer network, ad hoc network, mesh network, etc.) accessible via a network interface (e.g. an Ethernet port, a WiFi card, a cellular network, an infrared transmitter, a serial port, a radio transmitter, a Bluetooth interface, etc.).

Content management engine is functionally connected to content sources 112, 114, and 116, output device 140, and sensor 154 via network 120 through interface 135 (e.g. an application program interface, a memory location, a PaaS service, an IaaS service, an SaaS service, a remote procedure call, an FTP client, an FTP server, an SMS client, an SMS server, an SMTP client, an SMTP server, an HTTP client, an HTTP server, a file system, a search engine, etc.). Interface 135 acts as a module that allows content management engine 130 to pull data from various sources, interact with one or more users through output devices, and serve environmental models of 3D environments through output devices. As such, interface 135 comprises a chroma key content source interface configured to provide access various content sources 112, 114, and 116 to content management engine 130.

The content management engine 130 is configured to obtain a digital representation 132 of 3D environment scene 150 through interface 135. Digital representation 132 can comprise digital representations of various types of data modalities, such as images, sounds, smells, tastes, touch, tactile information, kinesthetic information, gesture information, location, time, temperature, humidity, weather information, biometric information, products, positions, text information, user information or other modalities encoded as digital data and beyond a human's ability to process. Digital representations of a 3D environment can be captured by one or more sensor devices, which could include a cell phone, a digital camera, a video recording sensor, a sound recording sensor, a particle sensor, a scanning sensor, a biometric sensor, a PH meter, a thermometer, an accelerometer, a potentiometer, a piezoelectric sensor, a keyboard, a touchpad, and/or other sensor platforms. In some embodiments, sensor data is pushed to content management engine 130, such as when a user of output device 140 takes a photograph or a video of 3D environment 150 and transmits a file or a data stream containing that sensor data to content management engine 130. In other embodiments, sensor data is polled from content management 130 in response to a trigger, such as a request by a user to construct digital representation 132 of 3D environment scene 150. In still other embodiments, content management engine 130 might regularly poll sensor data to update digital representation 132 in accordance with a polling schedule, such as every day, hour, 30 minutes, 5 minutes, or few seconds.

In some embodiments, a combination of the mentioned techniques could be used. For example a user might invoke an application on output device 140 that takes a video of environment 150 for a few minutes and transmits local user profile information, accelerometer data, and GPS position information to content management engine 140. Content management engine 140 could then use at least a portion of that transmitted information to identify environment 150 and polls a database that correlates environments to sensors to determine that other sensors, such as sensor 154, also has information on environment 150. Content management engine 140 then polls those other sensors to construct digital representation 132, and regularly polls those sensors to ensure that digital representation 132 is as up to date as the last polling period.

In some embodiments, such sensor information could be used to enhance the digital representation through filters applied to the received sensor information data. For example, a filter could be applied to a captured image that introduces a gradient to highly pixilated portions of the captured image, or another filter could be applied to a sound sample to reduce background noise collected from an audio sensor. Sensor information could also enhance the digital representation by retrieving supplementary environmental information through one or more databases using at least a portion of the sensor information as a seed of a query. For example, an identity of a person in the 3D environment could be identified using a face-matching algorithm that uses an image taken by a digital camera as a seed, or traffic information could be retrieved from a traffic database using a location taken by a GPS sensor as a seed. Content management engine 130 could be configured to construct the digital representation 132 of 3D environment scene 150 by aggregating information from a plurality of sensors. Some sensors may be included in output device 140, but exemplary sensors could be accessible only via network 120, distal to both output device 140 and content management engine 130, without departing from the scope of the invention.

Once digital representation 132 has been constructed, content management engine 130 could use at least a portion of digital representation 132 of 3D environment scene 150 to derive one or more environment attributes 131 of environment 150. Each of the environment attributes 131 could be represented as a data object that describes an attribute related to at least a portion of digital representation 132. For example, content management engine 130 can derive environment attributes 131 representing "a movie theater" from a digital photograph showing a big screen, a marquee, a popcorn cart, or theater seats, or from a sensor that retrieves GPS coordinate information. General attributes could be derived from the environment type, and specific attributes could be derived from a unique identifier of the environment. For example, once content management engine 130 determines that environment 150 is a movie theater, content management engine 130 could extrapolate attributes that any movie theater would have, such as seating, a movie screen, aisles, employees, an entrance, an egress, and a listing of movies. Should content management engine 130 derive a unique identifier for the movie theater, content management engine 130 could use the unique identifier to query one or more databases to find out environment-specific information, such as the name of the theater, the address of the theater, the identity of employees at the movie theater on a specific day, the number of movies playing in the theater, the square footage of the theater, and so forth. In an alternative embodiment, content management engine 130 could derive environment attributes 131 representing "a busy street" from a sound recording of cars' honking or people's footsteps. Environment attributes 131 could also include raw and/or processed sensor information, such as a color of an object in the environment, a temperature of the environment, or a gesture made by an entity within the environment.

Content management engine 130 generally further instantiates an environment model based on the digital representation 132. The environment model could comprise a 2D representation or a 3D representation of 3D environment 150 (e.g., a real-world room, a real-world outdoor setting, a real-world event, a real-world building, a real-world stage, a real-world work space, a real-world work store, a virtual setting, a mixed reality setting, a gaming environment, a sporting environment, a shopping environment, a social environment, a vehicle environment, a restaurant setting, and a telepresense setting, etc.) based on the digital representation 132 of the 3D environment. For example, based on one or more 2D digital images of an office, content management engine 130 can virtually construct a 3D environment of the office. The environment model could also be a 2D representation of 3D environment 150 where the 2D representation might include image data possibly including relevant coordinate information of items within environment 150 and a point of view having a position and orientation of where the 2D representation should be viewed from.

The point of view from which the environmental model is constructed is generally set by a user's context, application settings, or a user's input into a user interface of output device 140. For example, a user might be actively pointing a camera at environment 150 or could have a location device that informs content management engine 130 of where the user is relative to environment 150, and content management engine 130 could then construct the environmental model with respect to the location the user is relative to environment 150. The user might instruct a device to execute an application that has default camera angles or default positions within environment 150. In another embodiment, the user might instruct a device to execute a game application or another application which places a representation of the user (e.g., an avatar, an image of the user, a 3D image of the user, etc.) in a virtual environment, and the user could instruct his/her virtual representation to move around in the virtual environment using an input device, such as a console controller, a microphone that accepts voice commands, or a keyboard/mouse. Content management engine 130 could also present a user with a list of potential points of views, such as various seats within a stadium or various positions within a room, and the user could select one of the points of views from which the model is instantiated.

Content management engine 130 is further configured to identify at least one content anchor 133 associated with the 3D environment 150 based on a contextual trigger as a function of digital representation 132. As used herein, a "content anchor" of a 3D environment is a portion of the 3D environment (e.g., an anchor point or object in the 3D environment) relative to which the content will be rendered, or possibly replaced by (or overlaid with) chroma key content. Contemplated content anchors include a visual representation of a 2D surface, a visual representation of a 3D object, sounds within a portion of the environment, smells within a portion of the environment, textures of 3D objects of the environment, a gesture or a movement of an entity within the 3D environment, a temperature of a portion of the 3D environment, a temperature of an object of the 3D environment, or a text within the 3D environment. For example, in a 3D environment representing a baseball park, a content anchor can comprise any recognized objects or places at the baseball park (e.g., a visual representation of a pitcher mound, a visual representation of entities within stadium seats where fans are cheering their home team players, a scoreboard where statistics are shown, a sound of music playing from speakers in the stadium, a smell of a player in the stadium, a texture of a bat, etc.). In the exemplary environment 150, content anchor 152 comprises a 2D surface of a window of a room, upon which various chroma key content could be placed (e.g., overlaid). An environment 150 could have only one content anchor or a plurality of content anchors without departing from the scope of the invention.

Content anchor 133 could be derived from one or more descriptors (e.g., SIFT, FAST, etc.), based on recognition of an object in digital representation 132, or based on recognition of one or more environment attributes 131 of digital representation 132. For example, by executing one or more object recognition algorithms on the digital representation 132, the content management engine 130 can identify several objects within the digital representation 132 that can potentially selected as a content anchor. In some embodiments, the content management engine 130 can present the list of identified objects to a user and allows the user to select one object as the content anchor 133. In other embodiments, the content management engine 130 can (1) obtain a list of corresponding chroma key content based on the objects identified in the digital environment 132 and (2) select one object from the identified objects to be the content anchor 133 based on characteristics of the corresponding chroma key content. Under one approach, the content management engine 130 can select an object from the digital representation 132 that is of the same type of object represented by the chroma key content. For example, if the corresponding chroma key content is a sweater (based on a sweater object identified in the digital representation 132), the content management engine 130 can select the identified sweater object within the digital representation 132 as the content anchor. Under another approach, the content management engine 130 can select an object as the content anchor 133 based on characteristics of the object. For example, the content management engine 130 can select an object that has sufficient large enough surface area to be replaced by a chroma key content that is a message, a video, an image, an advertisement, etc.

Content anchor 133 also preferably comprises an anchor position (e.g., a coordinate, a vector, etc.) and an anchor orientation within the environmental model of the 3D environment 150. The anchor position and orientation can be determined relative to environment features of the 3D environment derived from the digital representation 132 and/or relative to a point of view of digital representation 132. Content anchor 133's position and orientation can also comprise at least six degrees of freedom (e.g., x-coordinate, y-coordinate, z-coordinate, pitch, yaw, roll) of the object. Consider a scenario where there is a digital image of a baseball stadium. Content anchor 133 can be determined relative to the location of the pitcher's mound. In one example content anchor 133 might be placed at home plate 60.5 feet away relative to the position of the pitcher's mound and at a 0 degree angle with respect to a point of view of the pitcher's mound. Alternatively, content anchor 133 placed at home plate could be determined relative to the point of view of a fan sitting in an outfield seat in right field, which is 180 feet away from the outfield seat and 140 degrees from the fan's point of view.

The point of view of digital representation 132 could be determined in a variety of ways. In some embodiments, the point of view of digital representation 132 can be determined as a function of a sensor position and sensor orientation of a sensor (e.g., a microphone, a biosensor, a camera, an accelerometer, a magnetometer, a wireless port, a gyroscope, etc) relative to the environment 150. For example, a position and orientation of the home plate can be determined relative to an apparent point of view of camera located at a third tier of seating behind the home plate. Or a position and orientation of a room could be determined relative to a location of output device 140 relative to environment 150. In some embodiments, output device 140 could have a user interface that allows a user to pick a point of view of environment 150. For example, where environment 150 is a baseball game, the user interface could display a map of environment 150, allowing the user to select a set within the map. Once the user selects a seat location within the map, the position of the point of view could be determined as the position of the seat, and the orientation of the point of view could be determined from the way the user holds output device 140.

The point of view can further comprise an apparent or virtual position and virtual orientation of a virtual device relative to the environmental model. In some embodiments, the virtual position and the virtual orientation of the virtual device are derived from the digital representation. Consider a scenario where a user is engaged in a video role playing game on a television output device. The television could obtain non-game chroma key content and overlay the chroma key content on the game display based on a the game's apparent or virtual camera position or orientation. One should appreciate that the television could operate based on the content delivered by the game and that the game system is unaware of the television's activities. In another embodiment, the virtual point of view could be derived based on content presented on a television screen including standard television programming. Although no sensor is used to capture the televised content, the television can be configured to calculate the virtual point of view based on the content as if the content were captured as sensor data local to the television.

Content anchor 133 can also comprise a time varying anchor (e.g. a location, a contextual signature, an absolute time, a relative time, a time span, etc.), which can change with time or motion. For example, content anchor 133 can be a derived from a representation of maple tree leaves (i.e. brown maple tree leaves), which change colors as season changes. Thus, the color change of the leaves could cause changes in the determination of content anchor 133. At one time brown maple tree leaves are on the tree itself, at another time brown maple tree leaves are scattered upon the ground, at another time brown maple tree leaves are set up in a pile next to the tree, and yet another time there are no brown maple tree leaves. Alternatively, a time varying anchor could include a path through the environmental model where the path is traced out in time.

Instead or in addition to selecting content anchor based on characteristics of the digital representation 132 and/or characteristics of the chroma key content, the content management engine 130 can identify different content anchors 133 based on one or more distinct contextual triggers 137. As used herein, a "contextual trigger" is a set of rules or conditions that determine circumstances under which what item(s) or feature(s) of an environment will be used as an anchor point. Since the context of an environment can be defined based upon digital representation 132 and environment attributes 131, when the context of an environment changes, the content anchor could change accordingly. Contextual triggers can comprise a circumstance, a state of mind, or a physical state (e.g., a location, a time, a context, a transparency, a color, a shape, a contrast, a temperature, a pressure, a proximity, a news event, a traffic condition, etc.). Consider a scenario where a user is at a movie theater. If content management engine 130 detects that the user is at the movie theater watching a movie with his friend (i.e. user purchased the movie ticket and selects a seat next to an acquaintance), the contextual trigger can be based on movie content. Based on the contextual trigger "movie content," content management engine 130 can identify a portion of the movie screen as a content anchor. However, if content management engine 130 detects that the user is at the movie theater watching celebrities entering the movie theater for an awarding ceremony (i.e. user does not have a movie ticket and the user has a camera), content management engine 130 might identify descriptors or features of objects associated with a red carpet as a content anchor.

Based on the environment attributes 131, content management engine 130 is capable of obtaining suitable chroma key content 134 via chroma key content source interface 135 from one or more content sources 112, 114, 116, or 137. Distal content sources 112, 114, and 116 are functionally coupled to interface 135 via a network 120 while local content source 137 is locally accessible on a non-transient computer readable memory on the same computer system that content management engine 130 is saved upon. In this case, content management engine 130 can obtain chroma key content 134 by sending a query to one of the content sources, where at least part of the query is formed using at least one of environment attributes 131. Content source 137 could be an a priori set of content, which is a part of content management engine 130.

Contemplated chroma key content sources include a chroma key content database, an on-line chroma key content server, and a memory storing chroma key content. Chroma key content sources could also be local to the content management engine 130, such as local content source 137 saved on a local chroma key content memory. Chroma key content sources are preferably saved on one or more non-transient computer-readable media accessible through a network interface to allow a plurality of content management engines to access one or more of the content sources. The chroma key content is preferably organized through an address scheme which ties chroma key content to one or more environment attributes, context attributes, and/or content anchors to allow for easier searching. Since chroma key content could be projected upon (e.g., overlaid on) a portion of either a 3D digital representation or a 2D digital representation, chroma key content preferably includes both 3D and 2D content, in addition to other content that could be presented in a virtual environment.

The chroma key content 134 can comprise substantially 2D content (e.g., image content, text content, video content, graphic data, a 2D mask, game data, etc.), 3D content representing perspective changes (e.g., rendered 3D models, a 3D mask, 3D video, etc.), higher dimensional content, or content based upon other senses (e.g. sounds, scents, textures, temperatures). As used herein, "substantial" content means at least 95% content by area (when referring to 2D content) or at least 95% content by volume (when referring to 3D content). For example, based on an environment attribute, perhaps based on a representation of a window in a wall, the content management engine can obtain a type of chroma key content representing flowing curtains, window stickers, roman shades, or other content that can be presented in conjunction with a representation of the window. Similarly, based on environment attributes, perhaps derived from a representation an office suite, the content management engine can obtain another type of chroma key content including furnishings chairs, desks, computers, telephones, office workers, or other office related chroma key content. In another example might include a virtual aviation training system where real world images viewed from a pilot's seat can be replaced with virtual images or a 3D video that could be seen in a real aviation experience. A plurality of attributes could be used, for example a window and an entity running away from the window, to place a scary chroma key content object, for example a giant bee, within the content anchor area of the window.

Chroma key content 134 can also comprise attributes, such as a preferred position and a preferred orientation relative to the point of view. For example, from an image of an opera concert, a user would prefer that a stage for the opera concert be located in front of him. In some embodiments, content management engine 130 is further configured to establish the content position/orientation 136 as a function of the preferred position and orientation. Thus, if a user's preferred position and orientation of an orchestra in the opera concert is right below the stage, the content management engine 130 can place chroma key content of an orchestra below the stage. Or if the immediate area below the stage is unavailable, content management engine 130 could place chroma key content of the orchestra as close to the area below the stage as possible.

Chroma key content 130 can also comprise multi-layer chroma key content. Consider a scenario of 3D environment of virtual fitting room where a customer can place a real world image of a piece of clothing to a virtual mannequin for a virtual fitting. In this case, the customer can place a plurality of chroma key content (e.g., multiple pieces of clothing such as a shirt, pants, and a jacket) to the content anchor (e.g., the virtual mannequin) to see how those pieces are layered or coordinated.

Once suitable chroma key content 134 is obtained for content anchor 133 and the content position/orientation 136 is established, content management engine 130 could then configure an output device 140 (e.g., a camera, a cell phone, a smart phone, a kiosk, an appliance, a movie camera, a game console, a handle-held game device, an augmented reality display, virtual reality glasses, a vehicle, a vending machine, a point of sales terminal, a television, a browser enabled computer, a and volumetric display, etc.) to render the chroma key content 134 at the content position/orientation 136 within a environmental model of the 3D environment with respect to a point of view. For example, if the window of the wall is placed at 45 degree on the left from a point of view, the content management engine can configure output device 140 to render an image of curtains at the same 45 degree angle as the view point of the window, which would be a different view outside the window if the window of the wall were placed at a 45 degree angle on the right of the point of view. Or if the user is positioned behind a dummy wearing a shirt generated by chroma key content, the user would see the back of a shirt, whereas a user positioned in front of the dummy would see the front of the shirt.

Where the point of view of the environment model is established by user input or a user context, content management engine 130 could be configured to alter chroma key content as a function of the user input or changes to the user's context. For example, if the chroma key content shows a view outside the window, and the user steps to the left, the view outside the window should change to reflect the step that the user took. Or if a user is running an application with a mixed reality game, and the user's context changes, for example the user levels up or the user gains an item in the game, an object that perpetually faces away from the user could now face toward the user, or the angle at which the user holds a chroma key sword could change to reflect a better sword-handling skill.

Content management engine 130 is further configured to render chroma key content 134 using non-visual content that may also be dependent upon the position/orientation of the point of view and the position/orientation of the content anchor, such as a texture mapped to a 3D object within the environment model or a smell mapped to a 3D object within the environment model. Contemplated non-visual content includes textures, smells, sounds, tastes, velocity, acceleration, humidity, temperature, and vibrations. For example, if an office chair within the office is a smooth leather chair with a steel frame, content management engine 130 can render a portion of chroma key content 134 as a smooth leather texture and a portion of chroma key content 134 as a steel frame texture. Or if the 3D environment has a chroma key train passing by the user on a railroad track, the pitch of the sound reaching the user will change depending upon how far the user is, which direction the user is facing, and whether the train is moving closer to the user's position or moving further from the user's position.

Content management engine 130 is further configured to render substantially 2D content as a texture mapped to a 3D object within the environment model. For example, a 2D video image can be overlaid around a barrel-shaped building. In this case, content management engine 130 can track the feature of the building's exterior including any irregularity in its structure by mapping the building's exterior, and properly synchronize the 2D video image on the building's exterior. Alternatively, substantially 2D chroma key content could be mapped around a beverage can once the beverage can has been recognized. In such an embodiment, a can of Coke® could become a viewing screen.

Content management engine 130 is also configured to configure output device 140 to simulate the environmental model (3D environment, 4D environment, sound, images, vibrations, etc.). For example, if a sound of classical music is detected from the left and right side of the front side, the content management engine can configure output device 170 to place two virtual wall mounted speakers to the left and right side of the front wall to simulate presentation of 3D sound environment of the environmental model.

The chroma key content management system can be applied to display medical images. Consider a scenario that a patient visits a doctor's office complaining pain in her right arm. The doctor can take a digital image of the patient sitting in his office via a web camera attached to his computer. The content management engine can obtain the digital image and derive that the digital image represents the doctor's office. Based on a contextual trigger that the digital image represents the doctor's office, the content management engine can be configured to identify a content anchor based on the patient. More specifically, the content anchor could be the patient's arm. Then, the content management engine can search a file system accessible from a doctor's computer via a network and obtain X-ray images or MRI images of the patient's right arm from content source (a hospital database, a shared database, etc.). The content management engine is further configured to establish the X-ray image's position and orientation based on the location and orientation of the patient's arm in the digital image. The content management engine is able to configure the doctor's computer or a mobile display device to render a digital image where the X-ray image is overlaid on the patient's arm.

The chroma key content management system can also be applied to real estate. Consider a scenario where a potential house buyer wants to virtually arrange his furniture and personal items in a house he is interest in. The potential buyer takes video images of rooms and hallways during a tour around the house. The content management engine can obtain video images that the potential buyer takes during the tour. The content management engine is configured to derive that the video image represents a house, a space in the house (room, hallways, etc.), or a structure in the house (wall, ceiling, etc.). The content management engine is further configured to identify "walls" as content anchor based on the contextual trigger—an empty house of interest. Then, the content management engine can obtain chroma key content including photo frames, wall clocks, or other wall fixtures. Such chroma key content can be obtained from any chroma key content sources including an internet webpage including commercial websites or a database of personal digital images representing the buyer's existing furnishings. The content management engine can establish a position and orientation of chroma key content of wall fixtures relative to the angle and height of the wall. Then, the content management engine can configure a display device to show the potential buyer a video of walls with wall fixtures. If the potential buyer changes his point of view (i.e. changing an angle he looks at the wall where he would like to place a wall fixture), the output device is configured to change the relative angle of the wall fixture overlaid to the video image with respect to the potential buyer's point of view.

The chroma key content management system can also be applied to generate 3D advertisements. For example, the content management engine can identify a virtual structure (e.g., virtual mannequins, virtual walls, etc.) shown in a user's monitor while the user is engaging in a virtual 3D computer game, and place 2D or 3D advertisements over the virtual structure with respect to the potential buyer's point of view.

The chroma key content management system can also be applied to toys. Take a scenario of a real-time role playing video game, which provides a virtual 3D environment. In this scenario, a user can obtain a new game item on a virtual bridge when he finishes building the bridge. The content management engine can obtain an image of finished bridge during the game, and overlay a 2D or 3D image of the new game item on the bridge at an angle and a size with respect to the potential buyer's point of view.

Figure 2:
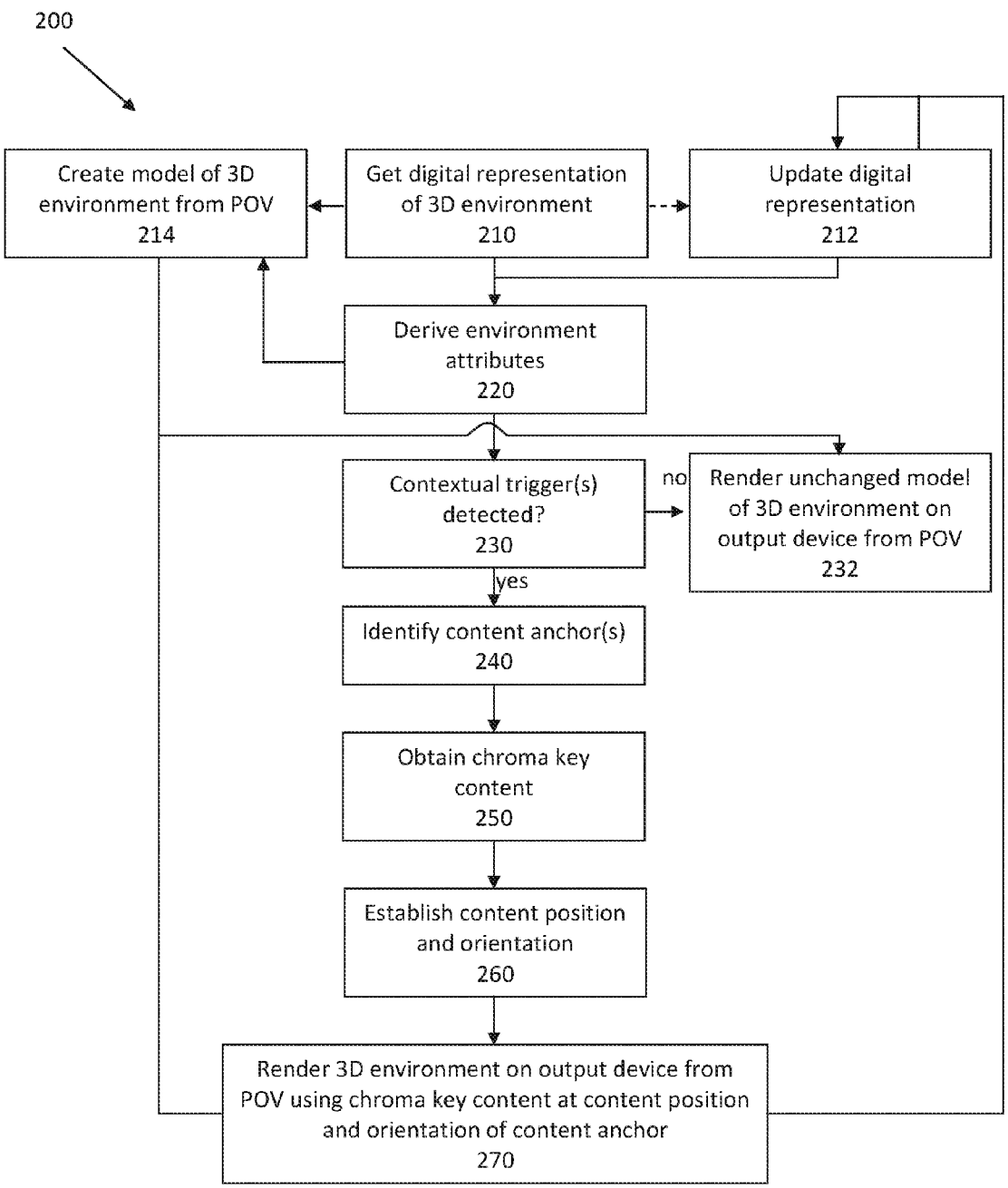
FIG. 2 is a flowchart showing steps performed by the exemplary chroma key content management system of FIG. 1.

In FIG. 2, flowchart 200 shows the steps taken by exemplary chroma key content management system 100. In step 210 the digital representation of the 3D environment is obtained, typically by constructing the digital representation from one or more sensors. Some sensors are located on output device 140, such as video camera 144 captures video content in environment 150. Other sensors are distributed about environment 150 and transmit sensor data to content management engine 130, such as sensor 154. Content management engine 130 could be configured to periodically poll the sensors to update its digital representation of the 3D environment in step 212. For example, a user could continuously film environment 150 using output device 140, which streams video content to content management engine 130, which continuously updates its digital representation of 3D environment 150 to keep up with the video stream. In other embodiments, content management engine 130 could be configured to periodically poll one or more sensors to update its digital representation of the 3D environment.

Once the digital representation of the 3D environment is collected (typically a set of images and environment variables collected by sensors and by databases queried with some of the aforementioned sensor data), content management engine 130 typically creates a model of the 3D environment from a point of view. Where output device 140 captures some of the sensor data directly from the 3D environment, the point of view of the model is typically the angle from which output device 140 is pointing at the 3D environment. Preferably, output device 140 has the ability to alter the point of view, for example by moving output device 140 around, or by utilizing a user interface to select different points of view around the model.

In step 220, content management engine 130 derives environment attributes from the digital representation of the 3D environment. The environment attributes typically consist of both raw sensor data and derived sensor data. Raw sensor data is typically data taken directly from a sensor, such as the image from a video camera, the temperature reading from a thermometer, or location data from a GPS locator. Derived sensor data is data that is derived from one or more raw sensor information, such as a 3D model compiled from a plurality of images, a 3D model pulled from a database containing 3D models that matches an image taken from a sensor, a score from a baseball game derived from a GPS location within a baseball stadium and the fact that the baseball game is currently being played at the baseball stadium, or a list of movie titles derived from a photo of a movie screen and a user account that holds a pre-paid movie ticket. The environment attributes help to give context to the digital representation of the 3D environment, and could also be used to flush out additional details of the model of the 3D environment in step 214. Example techniques for extracting object information from images or video that could be used by content management engine 130 includes U.S. patents to Boncyk U.S. Pat. Nos. 7,016,532; 8,224,077; 8,224,078; and 8,218,873.

In step 230, content management engine 130 detects whether any contextual triggers have been detected. Contextual triggers could consist of only a single detected variable, or a plurality of detected variables. An example of a simple contextual trigger could be the detection of a green screen in a 2D or 3D visual model of the 3D environment. An example of a complex contextual trigger could be the detection of a GPS locator within a predetermined longitude and latitude in combination with a user profile containing 3 necessary scavenger hunt longitude checked off with two items found within a photograph at a predetermined location. Content management engine 130 could be configured to detect any number of contextual triggers to determine suitable content anchors within the model of the 3D environment. If no contextual triggers are detected, the system will typically render the raw model of the 3D environment on the output device from the default point of view in step 232.

Typically, at least contextual trigger is detected, which is used to identify the content anchor in step 240. Chroma key content is then pulled from one or more content sources in step 250 as a function of one or more factors. Exemplary factors include environment attributes of the digital representation of the 3D environment, content anchor attributes, the contextual trigger, and the context of the 3D environment. The chroma key content could vary depending upon the position and orientation of the content anchor, the position and orientation of the point of view of the model of the 3D environment, and/or environment variables within the 3D environment. For example, if the chroma key content contains what a user might see if the user looked outside a window, the view of the window varies depending on the direction that the window is facing, and the angle from which the user is facing the window. Or if the chroma key content contains the smell of an animal, that smell would be stronger the closer the user is to the animal, or might be faint depending upon wind conditions around the animal and whether the user is downwind of the animal.

Once content management engine 130 takes into consideration all of these factors, the engine is ready to render the 3D environment on the output device in step 270. The 3D environment is rendered using the model generated in step 214, but the content anchor is altered by the chroma key content while taking into consideration at least one of the content position and orientation of the content anchor, the position and orientation of the point of view of the model, and environment attributes of the 3D environment. In this manner, the system is able to virtually alter a digital representation of the 3D environment in a more realistic manner. The digital representation could then be updated in step 212, which could possibly alter detected context triggers as environment attributes or points of view change, altering the chroma key content and the rendered model on output device 140 as a whole.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A chroma key content management system comprising:
a chroma key content source interface configured to provide access to a content source storing addressable chroma key content;
at least one non-transitory computer readable medium storing software instructions executable by at least one processor; and
a content management engine coupled with the chroma key content source interface and executable on the at least one processor according to the stored software instructions to:
obtain a digital representation of a 3D environment;
derive environment attributes from the digital representation;
execute one or more object recognition algorithms on the digital representation to recognize one or more objects from among a plurality of objects in the digital representation;
identify at least one content anchor associated with the 3D environment based on a contextual trigger as a function of the one or more recognized objects;
obtain chroma key content via the chroma key content source interface, at least in part, based on the environment attributes;
establish a content position and content orientation relative to the at least one content anchor as a function of content attributes of the chroma key content and the at least one content anchor; and
configure an output device to render, at least in part, an environmental model of the 3D environment based on the digital representation and render the chroma key content at the content position and content orientation within the environmental model with respect to a point of view from which the environmental model is rendered.

2. The system of claim 1, the chroma key content source interface comprises at least one of the following: an application program interface, a memory location, a remote procedure call, an HTTP client, an HTTP server, a file system, and a search engine.

3. The system of claim 1, wherein the digital representation comprises at least one of the following data modalities: image data, audio data, tactile data, kinesthetic data, gesture data, location data, time data, weather data, biometric data, product data, position data, and user data.

4. The system of claim 1, wherein the chroma key content comprises substantially 2D content.

5. The system of claim 4, wherein the substantially 2D content comprises at least one of the following: image content, text content, video content, graphic data, a 2D mask, and game data.

6. The system of claim 1, wherein the chroma key content comprises 3D content.

7. The system of claim 6, wherein the 3D content comprises at least one of the following: rendered 3D models, a 3D mask, and 3D video.

8. The system of claim 1, wherein the at least one content anchor comprises a coordinate within the environmental model of the 3D environment.

9. The system of claim 1, wherein the at least one content anchor comprises a vector within the environmental model of the 3D environment.

10. The system of claim 1, wherein the at least one content anchor comprises an anchor position and an anchor orientation relative to environment features of the 3D environment derived from the digital representation.

11. The system of claim 10, wherein the environment features comprise descriptors derived from the digital representation.

12. The system of claim 1, wherein the at least one content anchor comprises an anchor position and an anchor orientation relative to the point of view derived from the digital representation.

13. The system of claim 1, wherein the at least one content anchor comprises a time-varying content anchor.

14. The system of claim 13, wherein the time varying content anchor depends on at least one of the following: a location, a signature, an absolute time, a relative time, and a time span.

15. The system of claim 1, wherein the at least one content anchor comprises at least six degrees of freedom.

16. The system of claim 1, wherein the point of view comprises a sensor position and sensor orientation of a sensor relative to the environmental model.

17. The system of claim 16, wherein the sensor comprises at least one of the following: a microphone, a biosensor, a camera, an accelerometer, a magnetometer, a wireless port, and a gyroscope.

18. The system of claim 1, wherein the point of view comprises a virtual position and virtual orientation of a virtual device relative to the environmental model.

19. The system of claim 18, wherein the virtual position and the virtual orientation are derived from the digital representation.

20. The system of claim 18, wherein the virtual position and the virtual orientation are associated with a virtual camera.

21. The system of claim 1, wherein the chroma key content comprises attributes representing a preferred position and a preferred orientation relative to the point of view.

22. The system of claim 21, wherein the content management engine is further configured to establish the content position and the content orientation as a function of the preferred position and orientation.

23. The system of claim 1, wherein the chroma key source interface is configured to communicatively couple with at least one of the following: a chroma key content database, an on-line chroma key content server, a local chroma key content file system, and a memory storing the addressable chroma key content.

24. The system of claim 1, wherein the output device comprises at least one of the following: a camera, a cell phone, a smart phone, a kiosk, an appliance, a movie camera, a game console, a hand held game device, an augmented reality display, virtual reality glasses, a vehicle, a vending machine, a point of sales terminal, a television, a browser enabled computer, and a volumetric display.

25. The system of claim 1, wherein the environmental model is instantiated to represent at least one of the following: a real-world room, a real-world outdoor setting, a real-world event, a real-world building, a real-world stage, a real-world work space, a real-world work store, a virtual setting, a mixed reality setting, a gaming environment, a sporting environment, a shopping environment, a social environment, a vehicle environment, a restaurant setting, and a telepresense setting.

26. The system of claim 1, wherein the content management engine is further configured to render the chroma key content as a texture mapped to a 3D object within the environment model.

27. The system of claim 1, wherein the chroma key content comprises multi-layer chroma key content.

28. The system of claim 1, wherein the contextual trigger is a function of at least one of the following: a location, a time, a context, a transparency, a color, a shape, a contrast, a temperature, a pressure, a proximity, a news event, and a traffic condition.

29. A chroma key content management system comprising:
a chroma key content source interface configured to provide access to a content source storing addressable chroma key content;
at least one non-transitory computer readable medium storing software instructions executable by at least one processor; and
a content management engine coupled with the chroma key content source interface and executable on the at least one processor according to the stored software instructions to:
obtain a digital representation of a 3D environment;
derive environment attributes from the digital representation;
execute one or more object recognition algorithms on the digital representation to generate one or more descriptors from a plurality of objects in the digital representation;
identify at least one content anchor associated with the 3D environment based on a contextual trigger as a function of the one or more generated descriptors;
obtain chroma key content via the chroma key content source interface, at least in part, based on the environment attributes;
establish a content position and content orientation relative to the at least one content anchor as a function of content attributes of the chroma key content and the at least one content anchor; and
configure an output device to render, at least in part, an environmental model of the 3D environment based on the digital representation and render the chroma key content at the content position and content orientation within the environmental model with respect to a point of view from which the environmental model is rendered.

30. A chroma key content management system comprising:
a chroma key content source interface configured to provide access to a content source storing addressable chroma key content;
at least one non-transitory computer readable medium storing software instructions executable by at least one processor; and
a content management engine coupled with the chroma key content source interface and executable on the at least one processor according to the stored software instructions to:
obtain a digital representation of a 3D environment, the digital representation including a plurality of objects;
derive environment attributes from the digital representation;

identify at least one content anchor associated with the 3D environment based on a contextual trigger as a function of the digital representation;

obtain chroma key content via the chroma key content source interface, at least in part, based on the environment attributes;

establish a content position and content orientation relative to the at least one content anchor as a function of content attributes of the chroma key content and the at least one content anchor; and configure an output device to render, at least in part, an environmental model of the 3D environment based on the digital representation and render the chroma key content at the content position and content orientation within the environmental model with respect to a point of view from which the environmental model is rendered.

* * * * *